United States Patent [19]

Rickson

[11] Patent Number: 4,981,735

[45] Date of Patent: Jan. 1, 1991

[54] TWO PIECE THREADED MOUNTING INSERT WITH ADHESIVE FOR USE WITH HONEYCOMB COMPOSITE

[75] Inventor: Donald D. Rickson, Sunnyvale, Calif.

[73] Assignee: The United States of America as represented by the Secretary of the Army, Washington, D.C.

[21] Appl. No.: 405,829

[22] Filed: Sep. 5, 1989

[51] Int. Cl.⁵ .......................... B23B 3/12; F16B 37/04
[52] U.S. Cl. ..................... 428/36.9; 428/116; 428/117; 428/118; 428/137; 411/338; 411/339; 411/173; 411/177; 411/82; 411/258; 411/10; 411/11; 411/9
[58] Field of Search ............... 428/116, 117, 118, 137, 428/36.9; 411/338, 334, 173, 177, 82, 258, 10, 11, 9

[56] References Cited

U.S. PATENT DOCUMENTS

| | | |
|---|---|---|
| 3,041,912 | 7/1962 | Kreider et al. ...................... 428/116 |
| 3,042,156 | 7/1962 | Rohe .................................. 428/116 |
| 3,137,887 | 6/1964 | Mannino et al. .................... 428/116 |
| 3,417,803 | 12/1968 | Rohe et al. ...................... 411/177 X |
| 3,451,181 | 6/1969 | Nevschotz ......................... 428/116 |
| 3,526,072 | 9/1970 | Campbell .......................... 428/116 |
| 3,564,798 | 2/1971 | Darbz et al. ....................... 428/116 |
| 4,093,491 | 6/1978 | Whelpton et al. ................. 428/116 |
| 4,182,189 | 1/1980 | Dock et al. ........................ 411/9 X |
| 4,490,083 | 12/1984 | Rebish ................................ 411/338 |
| 4,761,860 | 9/1988 | Krauss ............................ 411/339 X |
| 4,869,632 | 9/1989 | Rudtke ............................ 411/339 X |
| 4,898,756 | 2/1990 | Oetner ........................... 428/36.9 X |

Primary Examiner—Ellis P. Robinson
Assistant Examiner—William R. Watkins, III
Attorney, Agent, or Firm—Freddie M. Bush; James T. Deaton

[57] ABSTRACT

A two-piece mount is provided that is adapted to have the two pieces screwed together and has a central bore through one of the two pieces for mounting an insert therein. Each of the two pieces of the mount has means for containing adhesive to allow the two mount pieces to be bonded to a composite structure when the two pieces have been mounted relative to the composite structure.

3 Claims, 1 Drawing Sheet

TWO PIECE THREADED MOUNTING INSERT WITH ADHESIVE FOR USE WITH HONEYCOMB COMPOSITE

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

In the past, composite honeycomb sandwich material structures have had inserts installed therein by having the insert secured to the honeycomb structure by using a potting compound to secure the insert to a bore made in the honeycomb structure. This way of securing inserts in the honeycomb structure is not sufficient for holding the insert in place in relation to the structure of the honeycomb structure. Therefore, there is a need for a simple structure that can mount an insert securely relative to composite honeycomb sandwich material.

Accordingly, it is an object of this invention to provide a two-piece mount that can be securely mounted relative to composite honeycomb structure for mounting an insert inside the two-piece mount.

Another object of this invention is to provide a two-piece mount in which loads exerted thereon are transferred directly into load bearing surfaces of face sheets of composite material to which the mount is secured.

Still another object of this invention is to provide two-piece mount that will give high shear and tensile load capabilities.

Other objects and advantages of this invention will be obvious to those skilled in this art.

SUMMARY OF THE INVENTION

In accordance with this invention, a two-piece mount is provided in which the two pieces are secured together and have flanges at opposite sides for contacting composite material to securely hold the two-piece mount relative to the composite material. Each mount has means by which the mount can be bonded to faces of the composite material to which the insert is mounted. One piece of the two-piece mount has a threaded bore in which an insert is secured for test purposes.

DESCRIPTION OF THE PREFERRED EMBODIMENT

Figure 1:
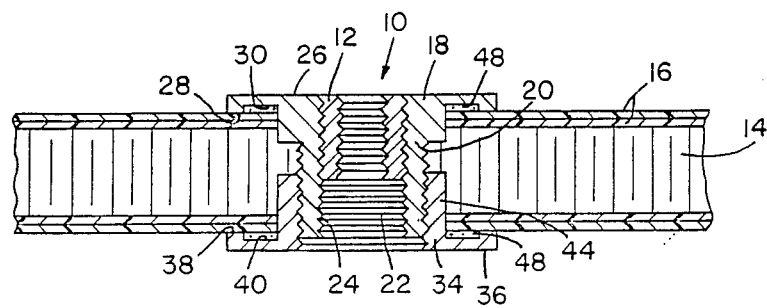
FIG. 1 is a sectional view of the mount secured relative to a composite honeycomb structure.
Figure 2:
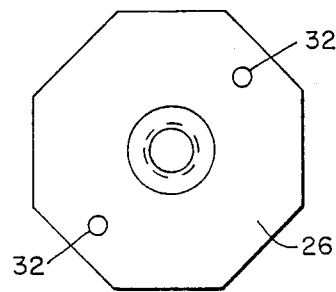
FIG. 2 is a too view of the two-piece mount.
Figure 3:
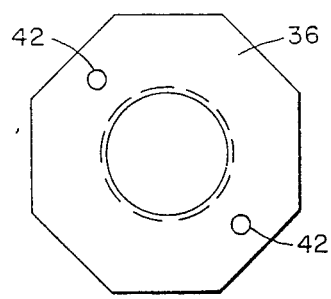
FIG. 3 is a bottom view of the two-piece mount.

Referring now to the drawing, a mount 10 is provided for mounting an insert 12 relative to composite honeycomb structure 14 that has face sheets 16. Mount 10 includes a plug structure 18 with a threaded projection 20 that has threads on its outer surface and bore 22 through plug 18 is threaded at 24. Plug 18 has a flat outer surface 26, an inner surface at 28 and circumferential groove 30. Witness holes 32 (See FIG. 2) ar provided for communication from groove 30 to the outer surface 26. The outer priphery of plug 18 is illustrated as being octagonal in shape but could be any other shape suitable for the engagement of a tool there with for tightening purposes. Insert 12 is threaded both internally and externally as illustrated and is threaded into threads 24 of plug 18. A tap 34 has a outer flat surface 36, an inner surface 38 and a curcumferential groove 40. Tap 34 has witness holes 42 that communicate groove 40 to the outer surface 36 of tap 34. The outer periphery of tap 34 is octagonal in shape for engagement therewith of a tool for tightening purposes, but this shape could be any other convenient shape for tightening two pieces together. Tap 34 has an inwardly projecting extension 44 that is internally threaded for engagement with outer threads 20 of plug member 18. A conventional adhesive 48 is provided in grooves 30 and 40 for securing mount 10 relative to the composite core structure without damage to face sheets 16 when members 18 and 34 are screwed together to secure mount 10 relative to the composite core structure. By providing adhesive 48, as the mount is tightened relative to the composite core structure, adhesive will be forced through witness holes 32 and 42 to indicate that the mount has been sufficiently tightened to secure the mount to the composite core structure and to insure that the mount is not tightened to such an extent as to damage face sheets 16. Adhesive 48 can be any conventional type adhesive, but preferrably is an adhesive that non-adheres when heated so that if necessary mount 10 can be removed from the composite core structure. A suitable adhesive that can be used for this purpose is labeled by the 3-M Company as adhesive In operation, when it is desired to provide a mount in the composite core structure for mounting an insert such as insert 12, all that is necessary is to provide a hole through the composite core structure and then secure mount 10 to the composite core structure by placing adhesive 48 in grooves 30 and 40 and then tightening structures 18 and 34 relative to each other until adhesive 48 is made to come through witness holes 32 and 42. Once the adhesive has setup, appropriate connections can be made with insert 12 to perform whatever tests are desired relative to the composite core structure.

I claim:

1. A mount for mounting an insert relative to a composite core structure comprising; a two-piece mount that is threaded together at elongated portions thereof that project in opposite directions when threaded together for securing the mount relative to a composite structure and each piece of the two-piece mount having a flanged portion at one end with an inner surface and an outer surface with the inner surface of each piece having a circumferential groove therein, one piece of said two-piece mount having a bore there through with an insert mounted therein, and each piece of said mount having peripheral tool engaging means for allowing the two pieces to be tightened or loosened relative to each other.

2. A mount as set forth in claim 1, wherein said mount is secured to a composite structure and said grooves have adhesive therein for bonding the mount relative to the composite structure.

3. A mount as set forth in claim 2, wherein each piece of said mount has holes therethrough which communicate the groove to the outer surface to provide witness holes for the adhesive to indicate when the two pieces of the mount have been tightened sufficiently relative to the composite structure.

* * * * *